(12) United States Patent
Rohr et al.

(10) Patent No.: US 9,440,520 B2
(45) Date of Patent: Sep. 13, 2016

(54) TRUCK CAP WITH HEAVY DUTY MOUNTING RACK

(71) Applicant: A.R.E. Accessories, LLC, Massillon, OH (US)

(72) Inventors: Andrew N. Rohr, Wadsworth, OH (US); Aaron N. Yonts, Marshallville, OH (US)

(73) Assignee: A.R.E. Accessories, LLC, Massillon, OH (US)

( * ) Notice: Subject to any disclaimer, the term of this patent is extended or adjusted under 35 U.S.C. 154(b) by 0 days.

(21) Appl. No.: 14/602,325

(22) Filed: Jan. 22, 2015

(65) Prior Publication Data

US 2016/0214542 A1 Jul. 28, 2016

(51) Int. Cl.
*B60J 7/16* (2006.01)
*B60R 9/06* (2006.01)

(52) U.S. Cl.
CPC ............... *B60J 7/1607* (2013.01); *B60R 9/06* (2013.01)

(58) Field of Classification Search
CPC ............. B60P 3/40; B60R 9/04; B60R 9/06; B60J 7/1607
USPC ............ 296/3, 37.6, 100.01, 100.02, 100.11, 296/100.12, 100.17, 100.18
See application file for complete search history.

(56) References Cited

U.S. PATENT DOCUMENTS

| 4,496,184 | A | | 1/1985 | Byrd | |
|---|---|---|---|---|---|
| 5,531,497 | A | * | 7/1996 | Cheng | B60J 7/061 296/100.01 |
| 6,439,646 | B1 | * | 8/2002 | Cornelius | B60J 7/102 224/309 |
| 7,198,185 | B2 | * | 4/2007 | Storer | B60R 9/00 224/403 |
| 7,959,200 | B2 | * | 6/2011 | Voglmayr | B60P 3/40 296/100.05 |
| 8,087,716 | B2 | | 1/2012 | Kramer | |
| 2003/0168879 | A1 | * | 9/2003 | Grudek | B60P 3/40 296/100.15 |
| 2010/0194137 | A1 | * | 8/2010 | Kealy | B60J 7/1614 296/100.01 |

* cited by examiner

*Primary Examiner* — Jason S Daniels
(74) *Attorney, Agent, or Firm* — Harness, Dickey & Pierce, PLC (57) ABSTRACT

A cap for the cargo bed of a pickup truck has a rigid internal frame with spaced front and rear frame members connected by longitudinally extending upper side rails and longitudinally extending bottom plates, said frame being supported on side walls of the pickup truck. A lightweight shell extends over the rigid frame and is supported on the side walls of the truck. A plurality of posts are attached to the side rails and extend vertically through holes formed in the shell and have one or more storage racks attached to the posts whereby all of the weight of the storage racks and cargo supported thereon is transmitted through the internal frame and supported by the truck body. The frame members are formed of T-slotted members providing support for sundry items inside the shell.

20 Claims, 8 Drawing Sheets

TRUCK CAP WITH HEAVY DUTY MOUNTING RACK

BACKGROUND OF THE INVENTION

1. Technical Field

The invention relates to truck caps, and in particular to an outer shell in combination with an internal rigid frame and an exterior mounting rack able to support heavy loads. Even more particularly, the invention relates to such a truck cap in which the weight of the heavy load that is supported on an external rack is supported by the truck body through the internal frame concealed within the cap shell.

2. Background Information

A considerable number of pickup-type trucks are used by individuals for many types of business activities or just as a personal vehicle. These pickup trucks have an open rear bed or cargo area which is exposed to the weather. Various types of enclosures are used to protect this cargo area from the weather and to secure cargo, tools, etc. stored in the rear area from theft. These enclosures are referred to as a shell, canopy, topper, bed cap, box cap etc. and come in numerous configurations and sizes. These enclosures are usually attached to and supported by the side rails or frame of the truck body which form two sides of the open cargo area. Many of these enclosures are made of fiberglass, aluminum, wood etc., with fiberglass being the most common.

Many of these pickup trucks are used in various industries and hold various types of tools and other equipment for use on a job site. However, due to the construction of the enclosure, usually of a lightweight material such as fiberglass, they are not able to support appreciable weight, even though it is desirable to mount ladders and other equipment on top of the enclosure. In order to be able to accommodate greater loads, the enclosure must be made of a more rigid material with internal reinforcing, which adds appreciable to the weight, size, and cost for the truck enclosure or have a type of support frame which extends externally about the weather-proof shell such as shown in U.S. Pat. No. 8,087, 716. Although some of these prior art reinforced caps and external frames enable the external load to be heavier than heretofore possible, they increase the cost of the truck enclosure, increase the external size of the vehicle cap and detract from the appearance thereof.

Therefore, there is a need for an improved truck enclosure or cap for the rear cargo area which is able to support greater loads externally of the enclosure adjacent the top thereof without detracting from the appearance of the vehicle while still providing weather-proof protection for the heretofore open truck bed or cargo area.

SUMMARY

In one aspect, the invention may provide a truck cap comprising: a frame for mounting on a vehicle body including front and back vertically extending frame members connected by a pair of spaced side rails extending generally horizontally therebetween; a shell extending over the frame adapted to be supported on the vehicle body; a plurality of posts attached to the frame and extending upwardly through respective holes formed in the shell; and a first rack attached to and extending between at least two of the posts externally of the shell.

In another aspect, the invention may provide a vehicle having an open rear portion, a rigid frame mounted adjacent the open rear portion and supported on the vehicle, and a shell extending over the frame and open rear portion of the vehicle, said frame including spaced front and back vertically extending frame members and a pair of side rails extending between said frame members and a plurality of posts attached to the frame and extending upwardly through a plurality of holes formed in the shell.

In another aspect, the invention may provide a truck cap for mounting on a rear portion of a vehicle body defining an open rear bed of the vehicle comprising: a rigid frame supported by the rear portion of the vehicle body and extending over the open rear bed; a shell covering the rigid frame and open rear bed and supported by the rear portion of the vehicle body; a plurality of posts attached to the rigid frame and extending through the shell; and a rack attached to the posts externally of the shell whereby the weight of a load supported on the rack is supported by the vehicle body through the rigid frame.

BRIEF DESCRIPTION OF THE SEVERAL VIEWS OF THE DRAWINGS

Sample embodiments of the invention are set forth in the following description, are shown in the drawings and are particularly and distinctly pointed out and set forth in the appended claims.

Similar numbers refer to similar parts throughout the drawings.

DETAILED DESCRIPTION

Figure 2:
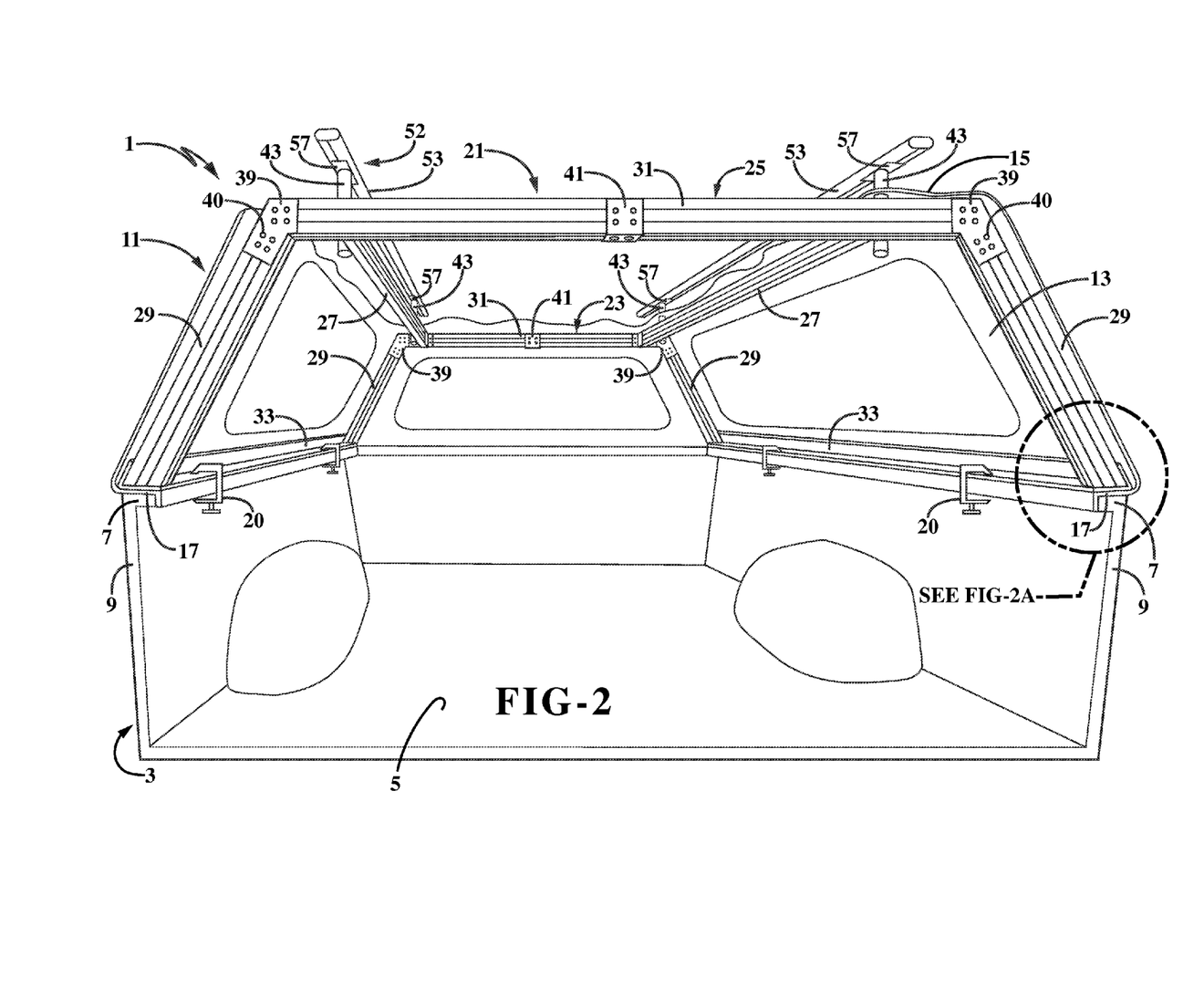
FIG. 2 is a fragmentary rear view of the truck body with the tailgate removed and part of the shell broken away showing the rigid internal frame of the improved truck cap mounted thereon.

The truck cap of the present invention is indicated generally at 1, and is shown mounted on a usual vehicle 3 such as a pickup truck, having an open rear cargo area 5 (FIG. 2). Vehicle 3 can have various configurations and will have some type of rear side rails or flanges 7 which extend along the top of vehicle side walls 9 and define cargo area 5. Truck cap 1 includes a usual enclosure indicated generally at 11, which preferably is made out of fiberglass, although it could be made out of wood, aluminum, or other types of material or combination thereof. Enclosure 11 is referred to hereinafter as a shell or cap although it is known by various other nomenclatures as discussed above.

Figure 2A:
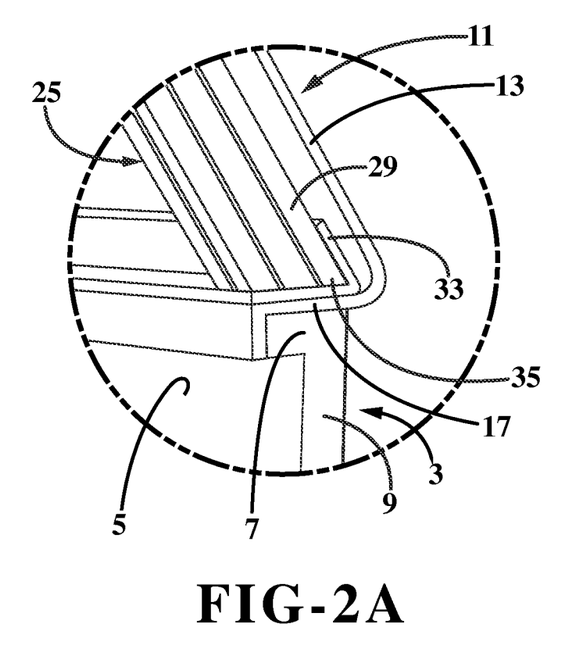
FIG. 2A is an enlarged view of the encircled portion of FIG. 2.

Shell 11 will have a usual construction with side walls 13 and an integral top wall or roof 15. Side walls 13 usually will terminate in some type of inturned bottom flanges 17 which rest on and extend along side rails 7 of the vehicle body as shown in FIGS. 2 and 2A. Bottom flanges 17 of shell 11 are usually secured to the truck body by C-clamps 20 or various other types of fasteners to removably mount shell 11 on the vehicle body with the weight of the shell being supported on rails 7 of the vehicle body. If desired, shell 11 can be permanently attached by bolts, rivets, etc. to the vehicle body.

Figure 3:
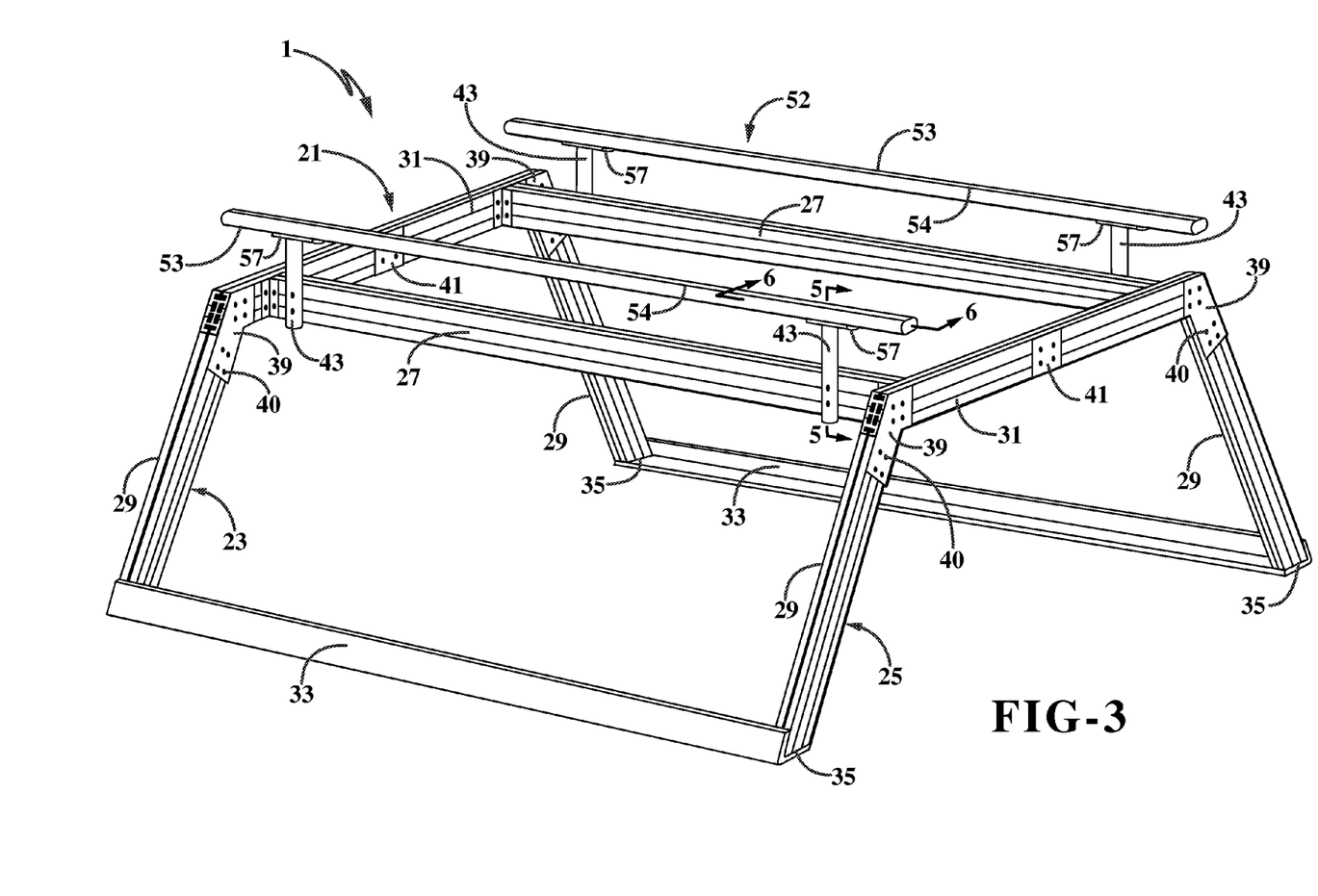
FIG. 3 is a perspective view of the internal frame of the truck cap of the present invention with a ladder rack attached prior to mounting on a pickup truck.

Referring to FIGS. 2 and 3, truck cap 1, in addition to shell 11, includes a rigid internal support frame indicated generally at 21. Frame 21 includes front and rear frame members 23 and 25, respectively, which are connected by a pair of spaced parallel side rails 27 which extend horizontally therebetween. In a first embodiment of frame 21, front and rear frame members 23 and 25 are similar in size and configuration, each being a three-member generally trapezoidal configuration with a pair of side legs 29 and a horizontal cross beam 31. Frame legs 29 are connected to cross beams 31 by angle plates 39 and a plurality of fasteners 40 such as rivets, bolts, T-slot fasteners or other types of well-known fasteners. Cross beams 31 may be a single member or could be two sections connected together by a fastening plate 41.

Figure 5:
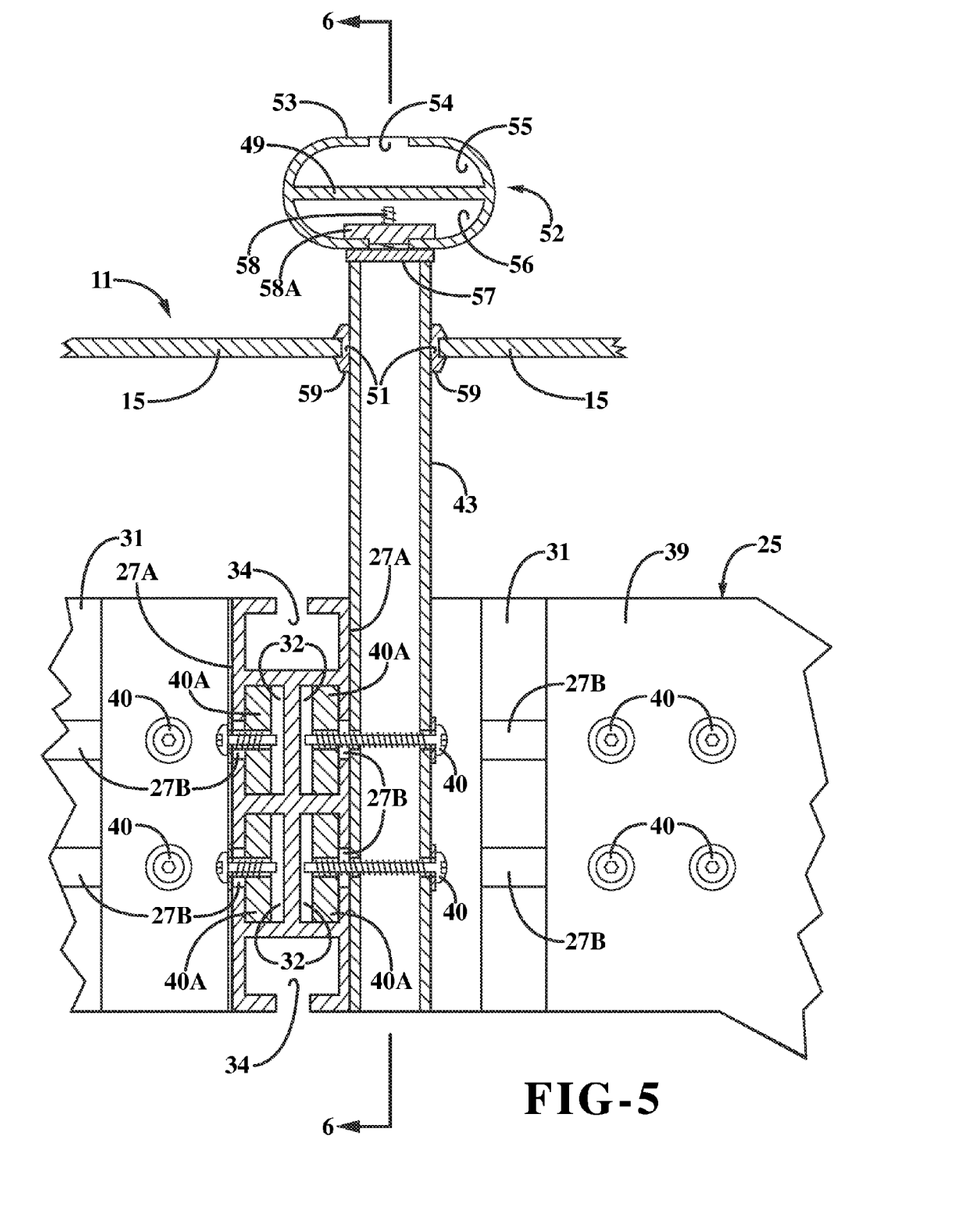
FIG. 5 is an enlarged sectional view taken on line 5-5, FIG. 3.

An angled steel plate 33 extends horizontally between the bottom ends 35 of each pair of legs 29 of the front and rear frame members (FIGS. 2 and 3). Angled plates 35 will rest upon the top of shell flanges 17 and supported on side rails 7 of the vehicle body as shown in FIGS. 2 and 2A. Plates 33 may be connected to frame legs 29 by rivets, bolts, welds, or other types of fasteners (not shown). Plates 33 preferably are secured to the vehicle body side rails by C-clamps 20 or other type fasteners well known in the truck cap industry. Preferably the frame members, and in particular frame legs 29, cross beams 31, and side rails 27 have a double slotted configuration referred to in the industry as double T-slotted members. This type of member is usually formed of an extruded aluminum and referring to side rails 27 in particular as shown in FIG. 5, has spaced outer parallel walls 27A each formed with an aligned pair of slots 27B for receiving fasteners 40 therethrough for engagement with T-slot nuts 40A contained within elongated rectangular-shaped channels 32. Each of the spaced ends of the T-rails 27 have T-shaped slots 34 formed therein. It is readily understood that other types of frame members can be used in forming frame 21 within the concept of the present invention, although the 1-rail configuration of the frame members has advantages discussed further below.

In accordance with a feature of the invention, a plurality of posts 43, preferably four, are quadrilaterally placed in a rectangular configuration on the top of frame 21, each being located generally adjacent the junction of side rails 27 with cross beams 31 (FIG. 3). As shown in FIG. 5, each post 43 is connected to its respective side rail 27 by spaced pairs of fasteners 40 and 1-slot nuts 40A which sit inside of the elongated channels 32 of the cross beam. Each post 43 preferably is a hollow tubular member which extends vertically upwardly from a respective side rail 27 and extends through aligned holes 51 formed in top wall 15 of shell 11 terminating a short distance above the top of wall 15.

A sealing ring or grommet 59 is placed about the outer circumference of each post 43 within holes 51 to seal the post and shell 11 providing a weatherproof seal therebetween. These seals can be various types of elastomer rings or even some type of applied sealant.

Various types of racks can be attached to the top ends of post 43, one common type being a ladder rack as referred to in the vehicle rack industry, which is indicated generally at 52 and shown on FIGS. 2, 3, and 5. These racks consist of a pair of oval-shaped elongated rails 53 and have a generally oval shape with a longitudinally extending top slot or opening 54 and a pair of internal channels or voids 55 and 56 separated by a wall 49. Rails 53 can be connected to top plates 57 which enclose the open tops of posts 43 by fasteners 58 and elongated nuts 58A. Plate 57 may be attached to the open top of post 43 by welds 64 (FIG. 6) or other type of attachment. It is readily understood that other types of rails or cargo supporting members can be attached to the tops of posts 43 without affecting the concept of the invention.

Figure 4:
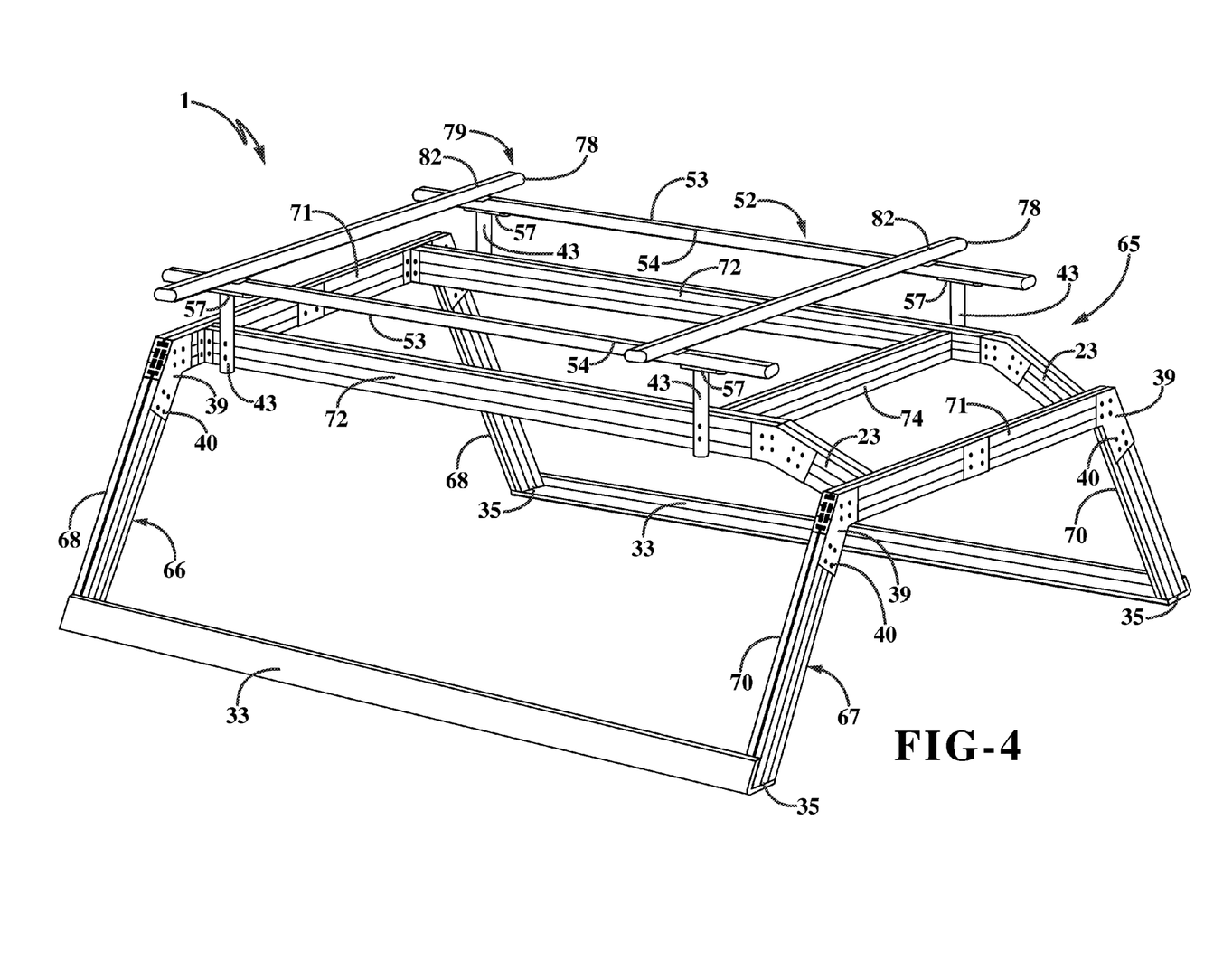
FIG. 4 is a perspective view similar to FIG. 3 showing another embodiment of the internal frame and with a pair of ladder racks attached thereto.

A modified cargo-supporting frame is shown in FIG. 4 and is indicated generally at 65, and will be used with taller end cap shells. Frame 65 will have front and rear frame member 66 and 67 respectively, each having a three member trapezoid configuration. Front frame member 66 will have upwardly angled legs 68 and a horizontal cross beam 69. Rear frame member 67 will have upwardly angled legs 70 and a cross beam 71. Front frame member 66 will be taller than rear frame member 67 and is connected thereto by parallel side rails 72 and a pair of downwardly sloped side rail sections 73 and a connecting cross beam 74.

This modified frame 65 enables a taller inside storage area, yet enables a usual tailgate and window to be installed adjacent the shorter rear frame member 67. This is in contrast to frame 21 discussed above wherein the front and rear frame members are equal in size and configuration.

Figure 1:
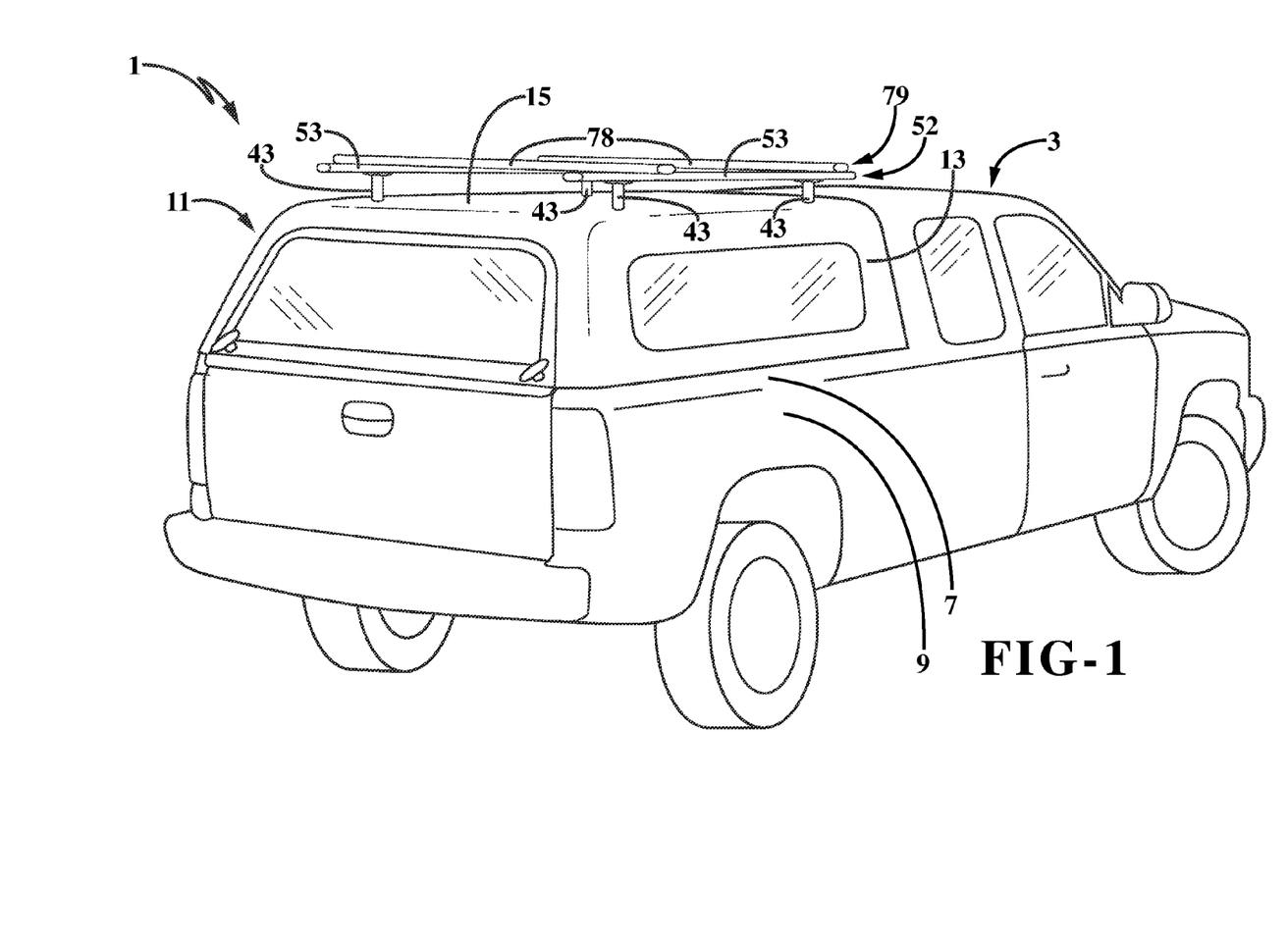
FIG. 1 is a diagrammatic perspective view showing a usual pickup truck having the improved truck cap or enclosure of the present invention mounted thereon.
Figure 6:
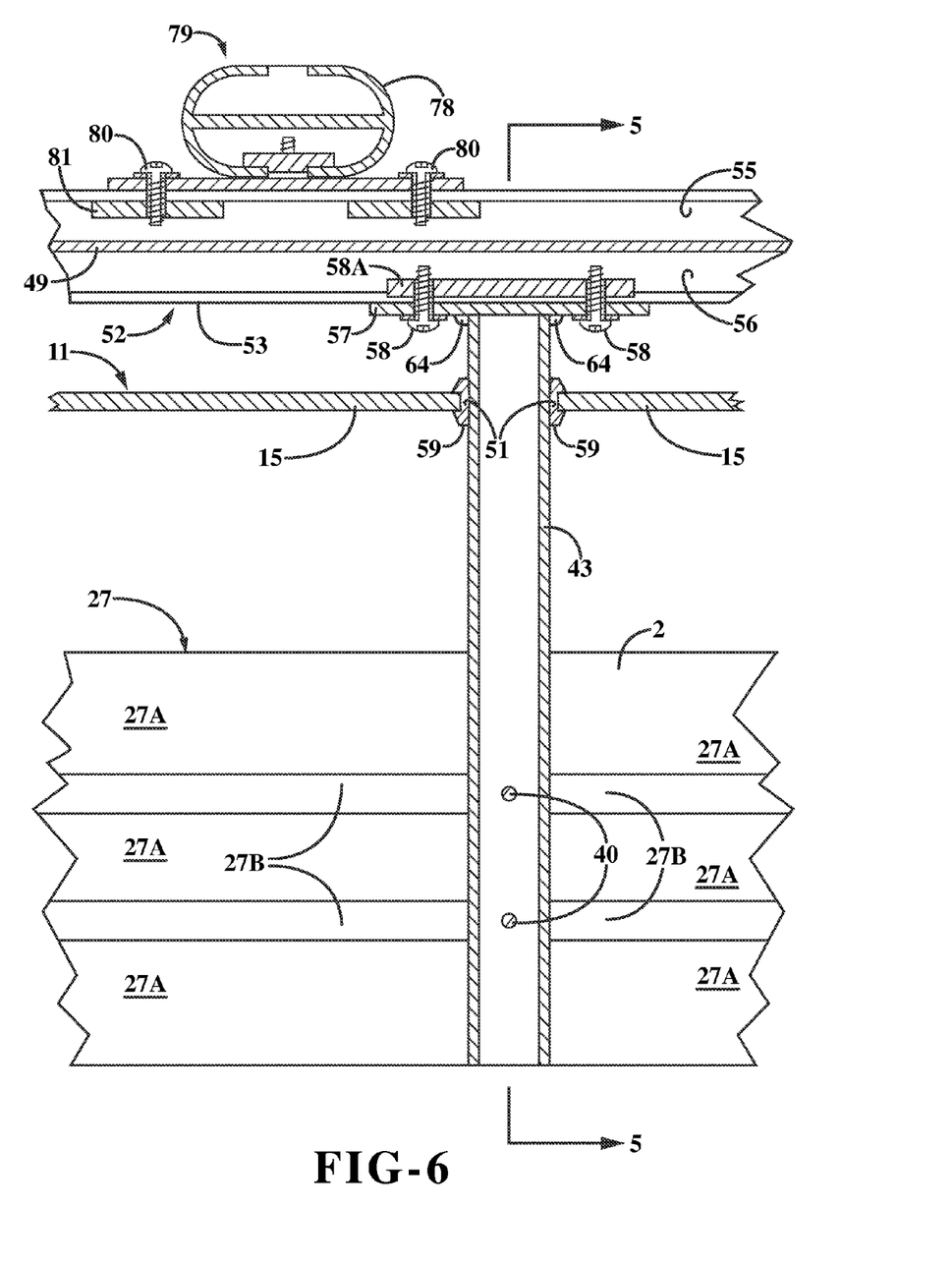
FIG. 6 is an enlarged sectional view taken on line 6-6, FIG. 3.

A usual ladder rack 52 similar to the ladder rack discussed above and attached to frame 21 having two spaced rails 53, can be attached to posts 43 and may have a second ladder rack 79 mounted on ladder rack 52. Rack 79 may be the same as or very similar to ladder rack 52 and have a pair of racks 78 connected to elongated rails 53 by a pair of fasteners or bolts 80 and nuts 81. The spaced pair of rails 78 of ladder rack 79 will extend transversely across rails 53 of ladder rack 52, as shown in FIGS. 1, 4, and 6.

Again, as with the embodiment of FIGS. 2, 3, and 5, this modified frame construction will transfer all of its supported weight onto the truck body through frame 65 and not be placed on the shell which will cover and conceal internal support frame 65. The frame members of frame 65 preferably are formed of the same single or double T-slot members as that of frame 21.

Figure 7:
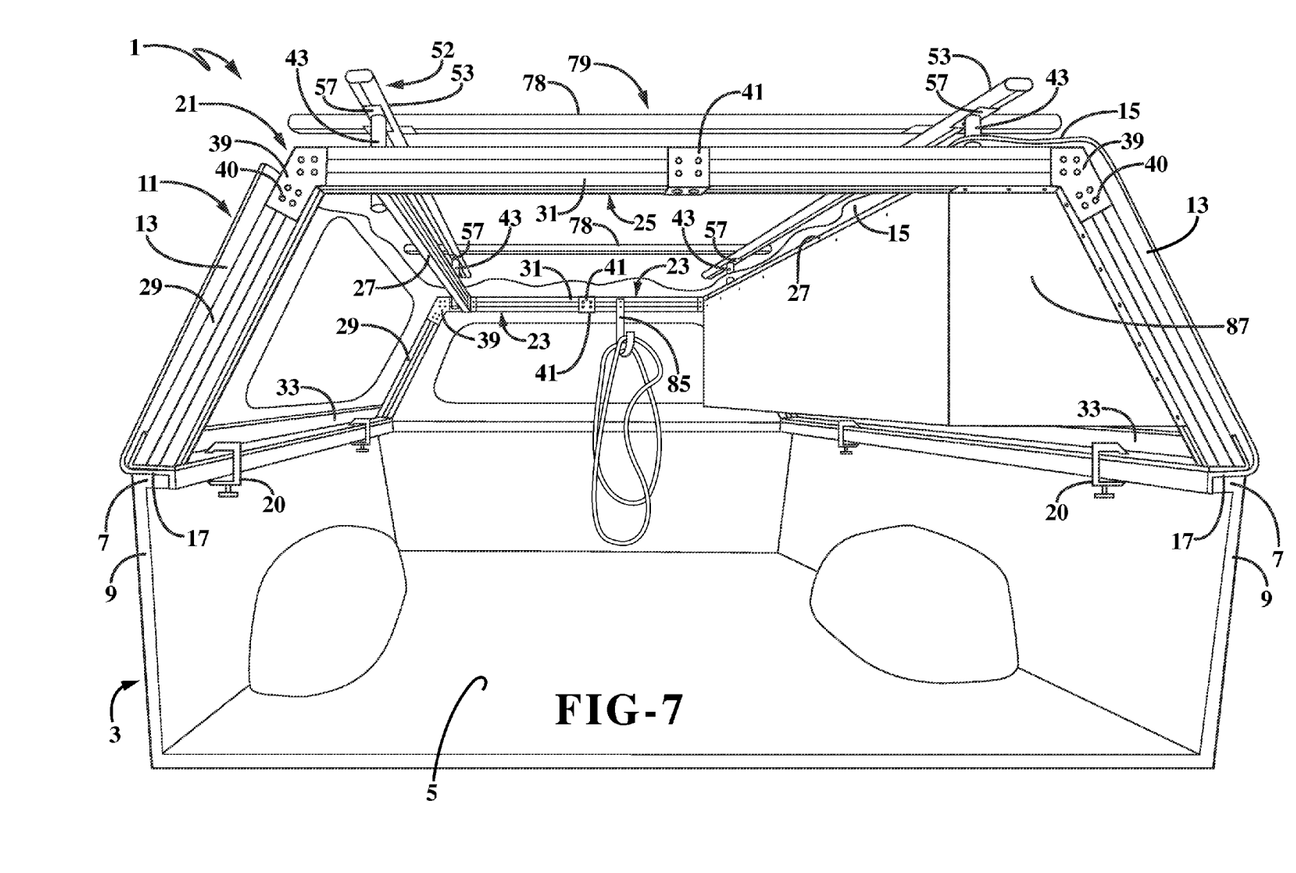
FIG. 7 is an internal rear view similar to FIG. 2 showing a tool box mounted on the internal frame and an example of a tool supported therein.

The forming of frame members 27, 29, and 31 of frame 21 and the frame members 68, 69, 70, 71, 73 and 74 of frame 65 of a T-slot configuration or even a double T-slot configuration as shown in the drawings, provides numerous locations within the cargo storage area, such as shown in FIG. 7, in which various types of hangers 85 can be secured in one or more of the T-shaped grooves for supporting various types of tools or equipment, such as a cable or wire 86 as an example shown in FIG. 7. This provides numerous locations completely along the length and width of the storage area in which to attach various brackets or other supporting hardware for the storage of tools or other equipment. Also, as shown in FIG. 7, an interior tool box 87 can be suspended on one of the side rails and attached to one of the front and rear rails which would be readily accessible either from the interior of the truck cap or through an external door in the covering shell well-known in the art.

Thus, the truck cap of the present invention provides a rigid internal frame which is easily mounted within the truck cargo area by supporting it on the side rails or flanges of the truck body, in combination with a lightweight external shell, which also is supported on the side flanges of the frame of the truck body. This provides a complete weather enclosure to the open cargo area of the truck while providing access thereto by a usual rear gate, rear window, or even side opening windows and doors. The support posts which extend through openings in the top roof of the shell can have various racks or other cargo-supporting structures attached thereto for supporting or containing any type of external load. Most importantly, the weight of any external load or cargo supported on the roof rack is transmitted by the posts to the internal frame directly onto the side walls or flanges of the vehicle body. This avoids any of the load being supported in any manner by the lighter, flexible, outer weather-proof shell. Furthermore, the seals between the posts and holes formed in the shell prevent any water or weather from entering the cargo storage area and causing damage to the stored contents.

It is readily understood that the truck cap of the present invention can be constructed as a combination consisting of the rigid internal frame with the posts extending through and sealed to the outer shell, or can be installed as a retrofit internal frame requiring only four holes to be drilled in the top wall of the shell for insertion of the four posts therethrough, afterwhich seals can be placed in or formed about the post once the frame is properly positioned with respect to the shell.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A truck cap comprising:
a frame for mounting on a vehicle body including front and back generally vertically and laterally extending frame members connected by a pair of spaced side rails extending generally longitudinally between the front and back frame members, the frame members each having a generally trapezoidal configuration comprising a cross-beam portion extending generally laterally between two generally upwardly and laterally inwardly extending side leg portions;
a rigid, non-collapsible shell extending over the frame adapted to be supported on the vehicle body;
a plurality of posts attached to the frame and extending substantially vertically through respective holes formed in the rigid, non-collapsible shell laterally inwardly between the side leg portions; and
a first rack attached to and extending between at least two of the posts externally of the rigid, non-collapsible shell;
wherein each post is attached to the frame at a position located laterally inwardly between the side leg portions to couple each post to the side leg portions via the cross beam portion.

2. The truck cap defined in claim 1 wherein each of the front and back frame members comprises a pair of separate extending legs forming the side leg portions and a separate cross beam forming the cross-beam portion.

3. The truck cap defined in claim 2 wherein the front and back frame members are similar to each other in size and shape.

4. The truck cap defined in claim 2 wherein certain of the horizontal cross beams and side rails of the front and back frame members are formed with at least one longitudinally extending T-slot.

5. The truck cap defined in claim 1 wherein the frame further includes a pair of horizontal bottom plates extending longitudinally between the front and back frame members parallel with the side rails.

6. The truck cap defined in claim 1 wherein the rigid, non-collapsible shell is formed of fiberglass.

7. The truck cap defined in claim 1 wherein a seal surrounds each of the posts at its respective hole formed in the rigid, non-collapsible shell.

8. The truck cap defined in claim 1 including a second rack attached to and extending horizontally transversely across the first track.

9. The truck cap defined in claim 1 wherein the plurality of posts includes two pairs of posts, each pair being coupled to the cross beam portion via the side rails, and wherein the side rails are coupled to each cross beam portion laterally inwardly between the side leg portions.

10. In combination, a vehicle having an open rear portion, a rigid frame mounted over the open rear portion and supported on the vehicle, and a rigid, non-collapsible shell extending over the frame and open rear portion of the vehicle, said frame including spaced front and back generally vertically and laterally extending frame members and a pair of side rails generally longitudinally extending between said frame members and a plurality of posts attached to the frame through a plurality of holes formed in the rigid, non-collapsible shell, wherein the front and back frame members each have a generally trapezoidal configuration comprising a cross-beam portion extending generally laterally between two generally upwardly and laterally inwardly extending side leg portions, and each post extends substantially vertically through the holes formed in the rigid, non-collapsible shell laterally inwardly between the side leg portions, and each post is attached to the frame at a position located laterally inwardly between the side leg portions to couple each post to the side leg portions via the cross beam portion.

11. The combination defined in claim 10 including a rack attached to and extending between the posts externally of the rigid, non-collapsible shell.

12. The combination defined in claim 10 where in the vehicle body includes a pair of spaced side panels extending along the open rear portion; in which the rigid frame includes a pair of bottom plates extending between the front and back frame members, said plates being supported on and extending along the spaced side panels of the vehicle, and wherein the frame members are supported on the side panels of the vehicle.

13. The combination defined in claim 10 wherein a seal surrounds each of the posts at its respective hole formed in the rigid, non-collapsible shell.

14. The combination defined in claim 10 including a first rack attached to and extending longitudinally between spaced pairs of the plurality of posts and a second rack attached to and extending transversely across the first rack.

15. The combination defined in claim 10 wherein each of the front and back frame members comprises a pair of separate side legs forming the side leg portions and a separate cross beam forming the cross-beam portion.

16. The combination defined in claim 10 wherein the front frame member has a greater vertical height than the back frame member, wherein the plurality of posts are coupled to the cross beam portion via the generally longitudinally extending side rails, and wherein the side rails are coupled to each cross beam portion laterally between the side leg portions.

17. The combination defined in claim 10 wherein certain of the front and back frame members and side rails are formed with the longitudinally extending T-slots.

18. A truck cap for mounting on a rear portion of a vehicle body defining an open rear bed of the vehicle comprising:
- a rigid frame including front and back frame members each having a generally trapezoidal configuration comprising a cross-beam portion extending generally laterally between two corners and a generally upwardly and laterally inwardly extending side leg joining each corner, the rigid frame being supportable by the rear portion of the vehicle body to extend over the open rear bed;
- a rigid, non-collapsible shell covering the rigid frame;
- a plurality of posts attached to the rigid frame and extending substantially vertically through holes in the rigid, non-collapsible shell located laterally inwardly between the corners; and
- a rack attached to the posts externally of the rigid, non-collapsible shell wherein when a weight of a load is supported on the rack and the rack is mounted on the vehicle, the weight is carried to the vehicle body through the rigid frame;
- wherein each post is attached to the frame at a position laterally inwardly between the corners to couple each post to the side legs via the cross-beam.

19. The truck cap defined in claim 18 wherein the front and back vertically extending frame members are connected by a pair of spaced, generally longitudinally extending side rails; and the plurality of posts are coupled to the cross beam portion via the generally longitudinally extending side rails, and wherein the side rails are coupled to each cross beam portion laterally between the side leg portions.

20. The truck cap defined in claim 19 wherein a pair of plates extend longitudinally between the side legs.

* * * * *